United States Patent
Oh et al.

(10) Patent No.: US 12,046,715 B2
(45) Date of Patent: *Jul. 23, 2024

(54) ELECTROLYTE FOR LITHIUM SECONDARY BATTERY AND LITHIUM SECONDARY BATTERY INCLUDING THE SAME

(71) Applicant: SK On Co., Ltd., Seoul (KR)

(72) Inventors: Sung Yon Oh, Daejeon (KR); In Haeng Cho, Daejeon (KR); Dong Gun Lee, Daejeon (KR); Jin Haek Yang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 92 days.

This patent is subject to a terminal disclaimer.

(21) Appl. No.: 17/495,864

(22) Filed: Oct. 7, 2021

(65) Prior Publication Data

US 2022/0029200 A1    Jan. 27, 2022

Related U.S. Application Data

(63) Continuation of application No. 16/658,222, filed on Oct. 21, 2019, now Pat. No. 11,177,507.

(30) Foreign Application Priority Data

Oct. 19, 2018    (KR) ........................ 10-2018-0125439

(51) Int. Cl.
  *H01M 10/0567*    (2010.01)
  *H01M 10/052*    (2010.01)
  *H01M 10/0568*    (2010.01)
  *H01M 10/0569*    (2010.01)

(52) U.S. Cl.
  CPC ..... *H01M 10/0567* (2013.01); *H01M 10/052* (2013.01); *H01M 10/0568* (2013.01); *H01M 10/0569* (2013.01); *H01M 2300/0025* (2013.01)

(58) Field of Classification Search
  None
  See application file for complete search history.

(56) References Cited

U.S. PATENT DOCUMENTS

| | | |
|---|---|---|
| 2012/0219866 A1 | 8/2012 | Onuki et al. |
| 2014/0272607 A1 | 9/2014 | Amine et al. |
| 2018/0254516 A1 | 9/2018 | Han et al. |

FOREIGN PATENT DOCUMENTS

| | | |
|---|---|---|
| CN | 103326068 A | 9/2013 |
| CN | 108365265 A | 8/2018 |
| JP | 2001160415 A | 6/2001 |
| JP | 2001345120 A | 12/2001 |
| JP | 2002203598 A | 7/2002 |
| JP | 2003187865 A | 7/2003 |
| JP | 2003234127 A | 8/2003 |
| JP | 2007242545 A | 9/2007 |
| KR | 1020160032470 A | 3/2016 |
| KR | 101720413 B1 | 3/2017 |
| WO | 2016088837 A1 | 6/2016 |

OTHER PUBLICATIONS

Chen et al., "LiPF6/LiBOB blend salt electrolyte for high-power lithium-ion batteries", Electrochimica Acta, 2006, pp. 3322-3326, vol. 51.

*Primary Examiner* — Carlos Barcena
(74) *Attorney, Agent, or Firm* — The Webb Law Firm

(57) ABSTRACT

Provided is a lithium secondary battery comprising: a cathode comprising a cathode active material, an anode comprising an anode active material, a separator interposed between the cathode and the anode, and an electrolyte for a secondary battery, wherein the cathode active material is $Li_x(Ni_aCo_bMn_c)O_2$, wherein $0.90 \leq x \leq 1.10$, $0.5 \leq a \leq 0.99$, $0.005 \leq b < 0.5$, $0.005 \leq c < 0.5$, and $a+b+c=1$, and the electrolyte for a secondary battery comprises a lithium salt, a nonaqueous organic solvent, and a cyclic phosphate compound represented by the following Chemical Formula 2:

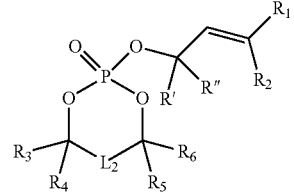

[Chemical Formula 2]

wherein $R_1$ to $R_6$ and $R'$ and $R''$ are independently of one another hydrogen or $C_1$-$C_4$ alkyl; $L_2$ is $-CR_7R_8-$; and $R_7$ and $R_8$ are independently of each other $C_1$-$C_4$ alkyl.

14 Claims, No Drawings

ELECTROLYTE FOR LITHIUM SECONDARY BATTERY AND LITHIUM SECONDARY BATTERY INCLUDING THE SAME

CROSS-REFERENCE TO RELATED APPLICATION

This application is a continuation of U.S. patent application Ser. No. 16/658,222, filed on Oct. 21, 2019, which claims priority to Korean Patent Application No. 10-2018-0125439 filed Oct. 19, 2018, the disclosures of which are hereby incorporated by reference in their entireties.

TECHNICAL FIELD

The following disclosure relates to an electrolyte for a lithium secondary battery and a lithium secondary battery including the same.

BACKGROUND

A lithium secondary battery is an electrochemical converter which may be used by charging electric energy using an external power supply, and has many merits such as higher energy density and longer life characteristics than a nickel-cadmium battery or a nickel-hydrogen battery which has been previously used. In recent years, as a demand for smart phones, tablet PCs, electric automobiles, and medium and large energy storage devices is increased, characteristics such as high capacity, high power, and long life of a lithium secondary battery are needed, and a demand for medium and large lithium secondary batteries which is able to store much energy is increased.

The lithium secondary battery produces electric energy by oxidation and reduction reactions occurring when lithium ions are intercalated into and deintercalated from cathode and anode, and is manufactured by filling an electrolyte between the cathode and anode, using a material into and from which lithium ions may be intercalated and deintercalated as the cathode and anode. Among these, the electrolyte is an ion conduction medium serving to transport lithium ions from a cathode to an anode during charging and from an anode to a cathode during discharging.

A liquid electrolyte is an organic solution of a lithium salt dissolved in an organic solvent, and an organic electrolyte which is currently widely used may include ethylene carbonate, propylene carbonate, dimethoxyethane, gammabutyrolactone, N,N-dimethylformamide, tetrahydrofuran, acetonitrile, or the like. However, since the organic electrolyte generally easily volatilizes and is highly inflammable, when the organic electrolyte is applied to a lithium ion secondary battery, there were problems in stability at a high temperature, such as ignition due to internal short circuit at the time of internal heat generation by overcharge and overdischarge.

In addition, in the lithium secondary battery, lithium ions from a lithium metal oxide which is a cathode at initial charge move to a carbon electrode which is an anode and are intercalated in carbon, in which lithium has strong reactivity so that a surface of a carbon particle, which is an anode active material, and an electrolyte are reacted, while a coating film which is referred to as a solid electrolyte interface (SEI) film is formed on an anode surface.

Performance of the lithium secondary battery greatly depends on a configuration of the organic electrolyte and the SEI film formed by the reaction of the organic electrolyte and the electrode. That is, the SEI film formed inhibits a side reaction of a carbon material and an electrolyte solvent, for example, decomposition of the electrolyte on the surface of the carbon particle which is the anode, prevents collapse of an anode material due to co-intercalation of the electrolyte solvent into the anode material, and also fulfills the conventional role as a lithium ion tunnel, thereby minimizing battery performance degradation.

Therefore, in order to improve the initial capacity, cycle characteristics, preserve characteristics at a high temperature, characteristics at a low temperature, self-discharge characteristics, overcharge characteristics, and the like, the electrolyte is used after adding various additives thereto.

Meanwhile, a charging voltage band of the lithium secondary battery which is currently the most commonly used is near 4.2 V. In order to increase energy density, more charge should be stored in a battery, and for this, the capacity of the cathode and the anode should be further increased. That is, a material which allows more lithium to be intercalated and deintercalated is needed.

As a cathode active material included in the cathode of the lithium secondary battery, a composite oxide of a metal selected from cobalt, manganese, nickel (Ni), and a combination thereof with lithium may be used, and among these, a high-Ni-based cathode active material containing high concentrations of Ni has been recently studied a lot, since the material may implement a high-capacity battery compared to the conventional lithium cobalt oxide.

However, a high-Ni-containing cathode active material has a week surface structure of the cathode, has increased instability during repeated charging/discharging processes, and thus, does not have good life characteristics and has increased resistance, resulting in a life deterioration problem.

When an operating voltage range is extended while the conventional electrolyte additive is used as it is in a high-voltage lithium secondary battery, lithium present between layers excessively escapes due to an increased capacity of the cathode and repulsion between oxygen and oxygen is increased to cause instability of a cathode structure. In addition, as a use voltage relatively rises, decomposition of the electrolyte becomes severe due to a side reaction occurring on the surface of the electrolyte, leading to a reduced life.

That is, as cathode active materials for high-voltage, various materials have been developed, known electrolytes are oxidized in a high voltage range and deteriorate performance of the cathode, and thus, it is difficult to commercialize the known electrolyte in reality.

As an example, Japanese Patent Laid-Open Publication No. 2001-345120 Å specifically discloses an electrolyte including a combination of sulfolene and triethylphosphate, in which sulfolene is polymerized in an electrode interface to form a film, thereby inhibiting a side reaction between the electrode and the electrolyte and inhibiting an increase of internal resistance. However, the document only discloses electrical properties by a combination of sulfolene and triethylphosphate specifically, and does not disclose an electrolyte including a cyclic phosphate compound having completely different forms alone and a lithium secondary battery employing the electrolyte or does not disclose it at all.

Accordingly, development of an electrolyte which may improve life characteristics and stability at a high temperature of a battery even at a high voltage of 4.2 V or higher corresponding to a high-capacity cathode, is needed.

RELATED ART DOCUMENTS

Patent Documents (Patent Document 1) JP 2001-345120 A

SUMMARY

An embodiment of the present invention is directed to providing an electrolyte for a lithium secondary battery which has excellent life characteristics and stabilizes a cathode structure during storage at a high temperature to have a minimized thickness increase rate while maintaining basic performance such as a high rate charge-discharge well, and a lithium secondary battery including the same.

In one general aspect, an electrolyte for a secondary battery includes:

a lithium salt;

a nonaqueous organic solvent; and a cyclic phosphate compound represented by the following Chemical Formula 1:

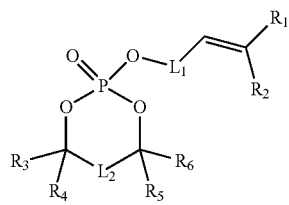

[Chemical Formula 1]

wherein $R_1$ to $R_6$ are independently of one another hydrogen or C1-C10 alkyl;

$L_1$ and $L_2$ are independently of each other $—(CR_7R_8)_n—$;

$R_7$ and $R_8$ are independently of each other hydrogen or C1-C10 alkyl; and n is an integer of 1 to 3, and when n is an integer of 2 or more, $R_7$ and $R_8$ may be identical to or different from each other.

In the electrolyte for a lithium secondary battery according to an exemplary embodiment of the present invention, the cyclic phosphate compound may be a cyclic phosphate compound represented by the following Chemical Formula 2:

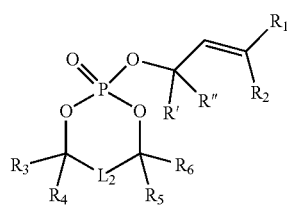

[Chemical Formula 2]

wherein $R_1$ to $R_6$ and R' and R" are independently of one another hydrogen or C1-C7 alkyl;

$L_2$ is $—(CR_7R_8)_n—$;

$R_7$ and $R_8$ are independently of each other hydrogen or C1-C7 alkyl; and n is an integer of 1 to 3, and when n is an integer of 2 or more, $R_7$ and $R_8$ may be identical to or different from each other.

In the electrolyte for a lithium secondary battery according to an exemplary embodiment of the present invention, preferably, in the above Chemical Formula 2, $R_1$ to $R_6$ and R' and R" may be independently of each other hydrogen or C1-C4 alkyl; $L_2$ may be $—CR_7R_8—$; $R_7$ and $R_8$ may be independently of each other C1-C4 alkyl.

In the electrolyte for a lithium secondary battery according to an exemplary embodiment of the present invention, preferably, the cyclic phosphate compound may be any one selected from the following structures:

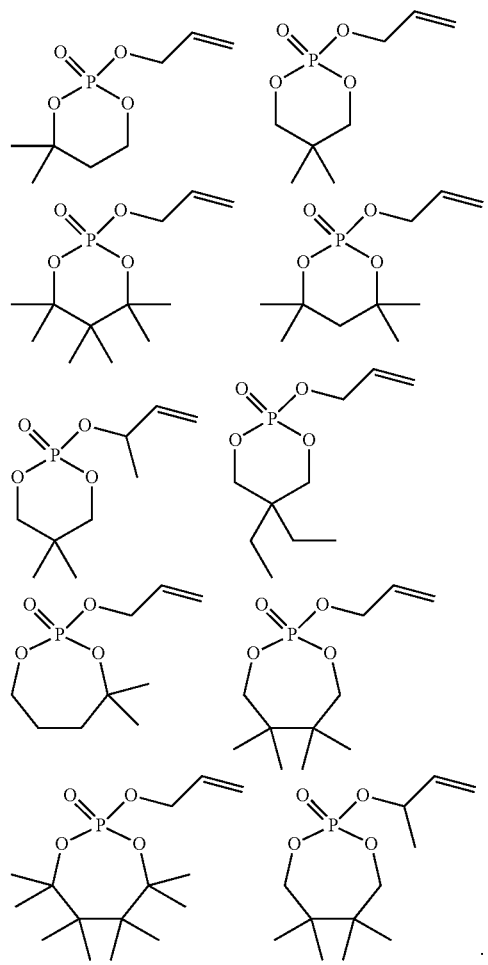

In the electrolyte for a lithium secondary battery according to an exemplary embodiment of the present invention, the cyclic phosphate compound may be included at 0.1 to 5.0 wt %, based on a total weight of the electrolyte.

In the electrolyte for a lithium secondary battery according to an exemplary embodiment of the present invention, the electrolyte may further include one or two or more additives selected from the group consisting of an oxalatoborate-based compound, an oxalatophosphate-based compound, a fluorine-substituted carbonate-based compound, a vinylidene carbonate-based compound, and a sulfinyl group-containing compound.

In the electrolyte for a lithium secondary battery according to an exemplary embodiment of the present invention, the electrolyte may further include any one or two or more additives selected from the group consisting of lithium difluoro(oxalato)borate, lithium bis(oxalato)borate, lithium tetrafluoro(oxalato)phosphate, lithium difluoro bis(oxalato) phosphate, fluoroethylene carbonate, difluoroethylene carbonate, fluorodimethyl carbonate, fluoroethylmethyl carbonate, vinylene carbonate, vinyl ethylene carbonate, dimethyl sulfone, diethyl sulfone, ethyl methyl sulfone, methyl vinyl sulfone, divinyl sulfone, ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, 1,3-butylene glycol sulfite, methyl methanesulfonate, ethyl methanesulfonate, methyl ethanesulfonate, propyl methanesulfonate, methyl propanesulfonate, ethyl propanesulfonate, vinyl methanesulfonate, allyl methanesulfonate, vinyl benzenesulfonate, allyl prop-2-enesulfonate, ethanesultone, 1,3-propanesultone, 1,4-butanesultone, ethenesultone, 1,3-propenesultone, 3-fluoro-1,3-propanesultone, 1,4-butenesultone, ethylene sulfate, propylene sulfate, 2,3-butylene sulfate, 1,3-propylene sulfate, and 1,3-butylene sulfate.

In the electrolyte for a lithium secondary battery according to an exemplary embodiment of the present invention, the additive may be included at 0.1 to 5.0 wt %, based on the total weight of the electrolyte.

In the electrolyte for a lithium secondary battery according to an exemplary embodiment of the present invention, the nonaqueous organic solvent may be selected from the group consisting of a cyclic carbonate-based solvent, a linear carbonate-based solvent, and a mixed solvent thereof; the cyclic carbonate may be selected from the group consisting of ethylene carbonate, propylene carbonate, butylene carbonate, vinylene carbonate, vinylethylene carbonate, fluoroethylene carbonate and a mixture thereof, and the linear carbonate may be selected from the group consisting of dimethyl carbonate, diethyl carbonate, dipropyl carbonate, ethylmethyl carbonate, methylpropyl carbonate, methylisopropyl carbonate, ethylpropyl carbonate, and a mixture thereof.

In the electrolyte for a lithium secondary battery according to an exemplary embodiment of the present invention, the nonaqueous organic solvent may have a mixed volume ratio of the linear carbonate solvent to the cyclic carbonate solvent of 1:1 to 9:1.

In the electrolyte for a lithium secondary battery according to an exemplary embodiment of the present invention, the lithium salt may be one or two or more selected from the group consisting of $LiPF_6$, $LiBF_4$, $LiClO_4$, $LiSbF_6$, $LiAsF_6$, $LiN(SO_2C_2F_5)_2$, $LiN(CF_3SO_2)_2$, $LiN(SO_3C_2F_5)_2$, $LiN(SO_2F)_2$, $LiCF_3SO_3$, $LiC_4F_9SO_3$, $LiC_6H_5SO_3$, $LiSCN$, $LiAlO_2$, $LiAlCl_4$, $LiN(C_xF_{2x+1}SO_2)(C_yF_{2y+1}SO_2)$ (wherein x and y are independently of each other a natural number), $LiCl$, $LiI$, and $LiB(C_2O_4)_2$.

In the electrolyte for a lithium secondary battery according to an exemplary embodiment of the present invention, the lithium salt may be present at a concentration of 0.1 to 2.0 M.

In another general aspect, a lithium secondary battery includes a cathode, an anode, and the electrolyte for a lithium secondary battery of the present invention.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, the present invention will be described in detail. Technical terms and scientific terms used in the present specification have the general meaning understood by those skilled in the art to which the present invention pertains unless otherwise defined, and a description for the known function and configuration obscuring the present invention will be omitted in the following description.

"Alkyl" described herein includes both a linear form and a branched form.

"Discharge" described herein means a process in which lithium ions are deintercalated from an anode, and "charge" means a process in which lithium ions are intercalated into an anode.

Hereinafter, the electrolyte for a secondary battery and the lithium secondary battery including the same according to an exemplary embodiment of the present invention will be described in detail.

The present invention relates to an electrolyte for a lithium secondary battery for providing a battery having an excellent life characteristic at a high temperature, and the electrolyte for a secondary battery of the present invention includes: a lithium salt; a nonaqueous organic solvent; and a cyclic phosphate compound represented by the following Chemical Formula 1.

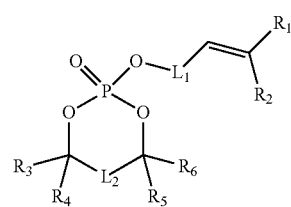

[Chemical Formula 1]

wherein $R_1$ to $R_6$ are independently of one another hydrogen or C1-C10 alkyl;

$L_1$ and $L_2$ are independently of each other $-(CR_7R_8)_n-$;

$R_7$ and $R_8$ are independently of each other hydrogen or C1-C10 alkyl; and n is an integer of 1 to 3, and when n is an integer of 2 or more, $R_7$ and $R_8$ may be identical to or different from each other.

The electrolyte for a secondary battery of the present invention includes the cyclic phosphate compound of Chemical Formula 1 having a 6 to 8-membered cyclic phosphate structure, in which alkenyloxy is substituted on a phosphorus (P) atom, whereby life characteristics at room temperature are surprisingly improved and a thickness increase rate at a high temperature is significantly low, and thus, the electrolyte is more stable at a high temperature.

More specifically, when the cyclic phosphate compound of Chemical Formula 1 of the present invention is used as an electrolyte additive, the cyclic phosphate compound is coordinately bonded to a transition metal of a cathode, thereby more stabilizing the structure of the cathode to lower resistance of the battery and also minimizing the thickness increase rate at a high temperature to significantly improve characteristics at a high temperature. In addition, when the cyclic phosphate compound of Chemical Formula 1 of the present invention is used as the electrolyte additive, cyclic life characteristics are improved, resulting in extension of a battery life.

In the electrolyte for a lithium secondary battery according to an exemplary embodiment of the present invention, in terms of chemical stability and electrical properties, preferably the cyclic phosphate compound may be represented by the following Chemical Formula 2:

[Chemical Formula 2]

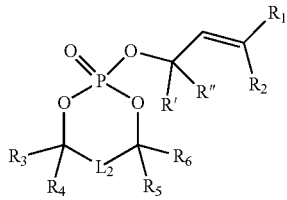

wherein $R_1$ to $R_6$ and $R'$ and $R''$ are independently of one another hydrogen or C1-C7 alkyl;

$L_2$ is —$(CR_7R_8)_n$—;

$R_7$ and $R_8$ are independently of each other hydrogen or C1-C7 alkyl; and n is an integer of 1 to 3, and when n is an integer of 2 or more, $R_7$ and $R_8$ may be identical to or different from each other.

Preferably, in the above Chemical Formula 2 according to an exemplary embodiment of the present invention, $R_1$ to $R_6$ and $R'$ and $R''$ may be independently of each other hydrogen or C1-C4 alkyl; $L_2$ may be —$CR_7R_8$—; and $R_7$ and $R_8$ may be independently of each other C1-C4 alkyl.

The cyclic phosphate compound according to an exemplary embodiment of the present invention may be specifically selected from the compounds having the following structures, but is not limited thereto:

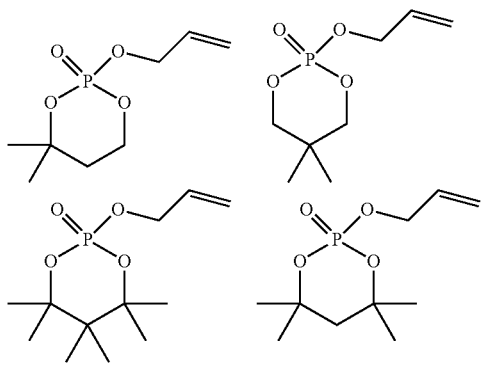

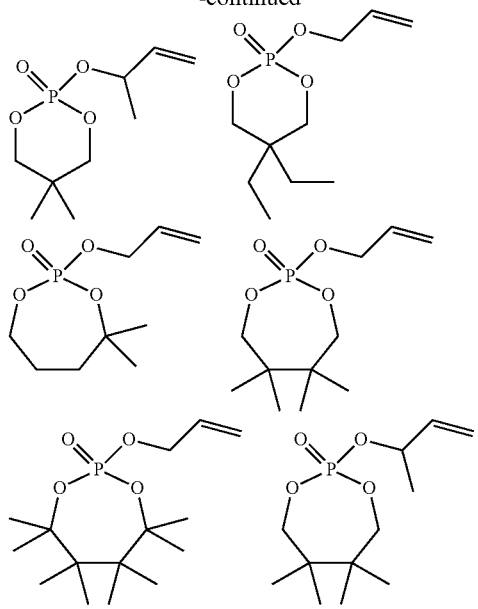

In terms of excellent life characteristics and storage stability at high temperature, more preferably, the cyclic phosphate compound may be represented by the following Chemical Formula 3:

[Chemical Formula 3]

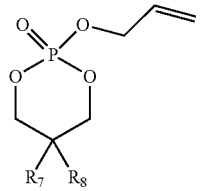

wherein $R_7$ and $R_8$ are independently of each other C1-C3 alkyl.

In the electrolyte for a lithium secondary battery according to an exemplary embodiment of the present invention, in terms of improving stability at a high temperature and a capacity retention ratio and preventing deterioration of lithium secondary battery characteristics due to rapid life deterioration occurrence and the like, the cyclic phosphate compound may be included at 0.1 to 5.0 wt %, and more preferably, in terms of the characteristics at a high temperature and life characteristics, the cyclic phosphate compound may be included at 0.5 to 3.0 wt %, based on the total weight of the electrolyte.

In the electrolyte for a lithium secondary battery according to an exemplary embodiment of the present invention, the electrolyte may further include one or two or more additives selected from the group consisting of an oxalatoborate-based compound, an oxalatophosphate-based compound, a fluorine-substituted carbonate-based compound, a vinylidene carbonate-based compound, and a sulfinyl group-containing compound, as a life improving additive for improving a battery life.

The oxalatoborate-based compound may be a compound represented by the following Chemical Formula A or lithium bis(oxalato)borate (LiB($C_2O_4$)$_2$, LiBOB):

[Chemical Formula A]

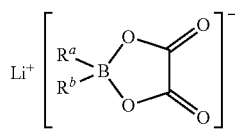

wherein $R^a$ and $R^b$ are independently of each other a halogen or halo C1-$C_{10}$ alkyl.

A specific example of the oxalatoborate-based additive may include lithium difluoro(oxalato)borate (LiB($C_2O_4$)$F_2$, LiDFOB), lithium bis(oxalato)borate (LiB($C_2O_4$)$_2$, LiBOB), or the like.

The oxalatophosphate-based compound may be a compound represented by the following Chemical Formula B or a lithium difluoro bis(oxalato)phosphate (LiPF$_2$($C_2O_4$)$_2$, LiDFBOP):

[Chemical Formula B]

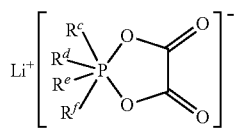

wherein $R^c$ to the $R^f$ are independently of one another a halogen or halo $C_1$-$C_{10}$ alkyl.

A specific example of the oxalatophosphate-based compound may include lithium tetrafluoro(oxalato)phosphate (LiPF$_4$($C_2O_4$), LiTFOP), lithium difluorobis(oxalato)phosphate (LiPF$_2$ ($C_2O_4$)$_2$, LiDFBOP), or the like.

The fluorine-substituted carbonate-based compound may be fluoroethylene carbonate (FEC), difluoroethylene carbonate (DFEC), fluorodimethyl carbonate (FDMC), fluoroethylmethyl carbonate (FEMC), or a combination thereof.

The vinylidene carbonate-based compound may be vinylene carbonate (VC), vinylethylene carbonate (VEC), or a mixture thereof.

The sulfinyl group (S=O)-containing compound may be a sulfone compound, a sulfite compound, a sulfonate compound, a sultone compound, or a sulfate compound, and these may be used alone or in combination.

The sulfone compound may be specifically a sulfone compound represented by the following Chemical Formula C:

[Chemical Formula C]

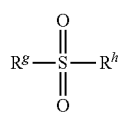

wherein
$R^g$ and $R^h$ are independently of each other hydrogen, a halogen, C1-C10 alkyl, C2-C10 alkenyl, halo C1-C10 alkyl, halo C2-C10 alkenyl, or C6-C12 aryl.

A non-limiting example of the sulfone compound may include dimethylsulfone, diethylsulfone, ethyl methyl sulfone, methyl vinyl sulfone, divinyl sulfone, or the like, but is not limited thereto. In addition, these compounds may be used alone or in combination of two or more.

The sulfite compound may be specifically a sulfite compound represented by the following Chemical Formula D:

[Chemical Formula D]

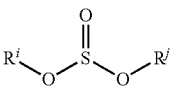

wherein
$R^i$ and $R^j$ are independently of each other, hydrogen, a halogen, C1-C10 alkyl, C2-C10 alkenyl, halo C1-C10 alkyl, halo C2-C10 alkenyl, or C6-C12 aryl, or $R^1$ and $R_1$ may be connected through —$CR^{100}R^{101}CR^{102}R^{103}$ ($CR^{104}R^{105}$)$_m$— to form a ring;

$R^{100}$ to $R^{105}$ are independently of one another hydrogen, C1-C10 alkyl or phenyl; and m is an integer of 0 or 1.

A non-limiting example of the sulfite compound may include ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, 1,3-butylene glycol sulfite, or the like, but is not limited thereto. In addition, these compounds may be used alone or in combination of two or more.

The sulfonate compound may be specifically a sulfonate compound represented by the following Chemical Formula E:

[Chemical Formula E]

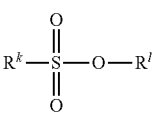

wherein
$R^k$ and $R^l$ are independently of each other hydrogen, a halogen, C1-C10 alkyl, C2-C10 alkenyl, halo C1-C10 alkyl, halo C2-C10 alkenyl, or C6-C12 aryl.

A non-limiting example of the sulfonate compound may include methyl methanesulfonate, ethyl methanesulfonate, methyl ethanesulfonate, propyl methanesulfonate, methyl propanesulfonate, ethyl propanesulfonate, vinyl methanesulfonate, allyl methanesulfonate, vinyl benzenesulfonate, allyl prop-2-enesulfonate, or the like, but is not limited thereto. In addition, these compounds may be used alone or in combination of two or more.

The sultone compound may be specifically a sultone compound represented by the following Chemical Formula F:

[Chemical Formula F]

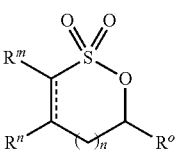

wherein
=== represents a single bond or a double bond;
$R^m$ to $R^o$ are independently of each other hydrogen, a halogen, C1-C10 alkyl, C2-C10 alkenyl, halo C1-C10 alkyl, halo C2-C10 alkenyl, or C6-C12 aryl; and
n is an integer of 0 to 3.

A non-limiting example of the sultone compound may include ethane sultone, 1,3-propane sultone (PS), 1,4-butane sultone (BS), ethene sultone, 1,3-propene sultone (PES), 3-fluoro-1,3-propane sultone (FPS), 1,4-butene sultone, or the like, but is not limited thereto. In addition, these compounds may be used alone or in combination of two or more.

The sulfate compound may be specifically a cyclic sulfate compound represented by the following Chemical Formula G:

[Chemical Formula G]

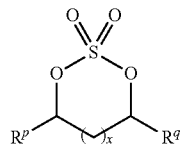

wherein $R^p$ and $R^q$ are independently of each other hydrogen, a halogen, C1-C10 alkyl, C2-C10 alkenyl, halo C1-C10 alkyl, halo C2-C10 alkenyl, or C6-C12 aryl; and x is an integer of 0 to 3.

A non-limiting example of the sulfate compound may include ethylene sulfate (ESA), propylene sulfate, 2,3-butylene sulfate, 1,3-propylene sulfate, 1,3-butylene sulfate, or the like, but is not limited thereto. In addition, these compounds may be used alone or in combination of two or more.

In an exemplary embodiment of the present invention, more preferably, the electrolyte may further include one or two or more additives selected from the group consisting of an oxalatoborate-based compound and a sulfinyl group-containing compound; more preferably, the electrolyte may further include one or two or more additives selected from the group consisting of the compound represented by Chemical Formula A, lithium bis(oxalato)borate (LiB(C$_2$O$_4$)$_2$, LiBOB), and the sultone compound represented by Chemical Formula F; and still more preferably, the electrolyte may further include a mixture of at least one selected from the group consisting of the compound represented by Chemical Formula A and lithium bis(oxalato)borate (LiB(C$_2$O$_4$)$_2$. LiBOB) and the sultone compound represented by Chemical Formula F, as the additive, in terms of the more improved characteristics of the lithium secondary battery including the electrolyte.

In an exemplary embodiment of the present invention, more specifically, the electrolyte may further include two or more additives selected from the group consisting of lithium difluoro(oxalate)borate (LiB(C$_2$O$_4$)F$_2$, LiDFOB), lithium bis(oxalato)borate (LiB(C$_2$O$_4$)$_2$, LiBOB), ethane sultone, 1,3-propane sultone (PS), 1,4-butane sultone (BS), ethene sultone, 1,3-propenesultone (PES), 3-fluoro-1,3-propanesultone (FPS), and 1,4-butenesultone.

More preferably, the electrolyte according to an exemplary embodiment of the present invention may further include lithium bis(oxalato)borate (LiB(C$_2$O$_4$)$_2$, LiBOB), 1,3-propane sultone (PS), or a mixture thereof, as an additional additive, and it is more preferred to include a mixture of lithium bis(oxalato)borate (LiB(C$_2$O$_4$)$_2$, LiBOB) and 1,3-propane sultone (PS), in terms of the more improved characteristics of the lithium secondary battery including the electrolyte.

In an exemplary embodiment of the present invention, the content of the additive is not significantly limited, but in order to improve a battery life within the electrolyte for a secondary battery, the additive may be included at 0.1 to 5.0 wt %, and more preferably 0.1 to 3.0 wt %, based on the total weight of the electrolyte.

In the electrolyte for a lithium secondary battery according to an exemplary embodiment of the present invention, the nonaqueous organic solvent may include carbonate, ester, ether, or ketone alone or in combination, and it is preferred that the nonaqueous organic solvent is selected from the group consisting of cyclic carbonate-based solvents, linear carbonate-based solvents, and mixed solvents thereof, and it is most preferred that a mixture of a cyclic carbonate-based solvent and a linear carbonate-based solvent is used. The cyclic carbonate solvent has a high polarity so that it may sufficiently dissociate lithium ions, but has a low ion conductivity due to its high viscosity. Therefore, the cyclic carbonate solvent may be mixed with a linear carbonate solvent having low polarity but low viscosity, thereby optimizing the characteristics of the lithium secondary battery.

The cyclic carbonate may be selected from the group consisting of ethylene carbonate, propylene carbonate, butylene carbonate, vinylene carbonate, vinylethylene carbonate, fluoroethylene carbonate, and a mixture thereof, and the linear carbonate may be selected from the group consisting of dimethyl carbonate, diethyl carbonate, dipropyl carbonate, ethylmethyl carbonate, methylpropyl carbonate, methylisopropyl carbonate, ethylpropyl carbonate, and a mixture thereof.

In the electrolyte for a lithium secondary battery according to an exemplary embodiment of the present invention, the nonaqueous organic solvent, which is a mixed solvent of a cyclic carbonate-based solvent and a linear carbonate-based solvent, may be used at a mixed volume ratio between the linear carbonate solvent:the cyclic carbonate solvent of 1:1 to 9:1, and preferably 1.5:1 to 4:1.

In the electrolyte for a lithium secondary battery according to an exemplary embodiment of the present invention, the lithium salt is not limited, but may be one or two or more selected from the group consisting of LiPF$_6$, LiBF$_4$, LiClO$_4$, LiSbF$_6$, LiAsF$_6$, LiN(SO$_2$C$_2$F$_5$)$_2$, LiN(CF$_3$SO$_2$)$_2$, LiN(SO$_3$C$_2$F$_5$)$_2$, LiN(SO$_2$F)$_2$, LiCF$_3$SO$_3$, LiC$_4$F$_9$SO$_3$, LiC$_6$H$_5$SO$_3$, LiSCN, LiAlO$_2$, LiAlCl$_4$, LiN(C$_x$F$_{2x+1}$SO$_2$)(C$_y$F$_{2y+1}$SO$_2$) (wherein x and y are independently of each other a natural number), LiCl, LiI, and LiB(C$_2$O$_4$)$_2$.

The concentration of the lithium salt is preferably within a range of 0.1 to 2.0 M, and more preferably within a range of 0.7 to 1.6 M. If the concentration of the lithium salt is less than 0.1 M, the conductivity of the electrolyte is lowered so that the performance of the electrolyte is poor, and if the concentration of the lithium salt is above 2.0 M, the viscosity of the electrolyte is increased so that the mobility of lithium ions is reduced. The lithium salt serves as a source of lithium ions in a battery, thereby allowing operation of a basic lithium secondary battery.

The electrolyte for a lithium secondary battery of the present invention is stable usually at a temperature range of −20° C. to 60° C. and maintains electrochemically stable characteristics even at a voltage range of 4.2 V or higher, and thus, may be applied to all types of lithium secondary batteries such as a lithium ion battery and a lithium polymer battery.

In particular, the electrolyte for a lithium secondary battery according to an exemplary embodiment of the present invention may be driven at a voltage of 4.2 V or higher, preferably 4.3 V or higher, and more preferably 4.35 V or higher, based on a cathode potential.

In addition, the present invention provides a lithium secondary battery including the electrolyte for a lithium secondary battery according to an exemplary embodiment of the present invention.

A non-limiting example of the secondary battery according to an exemplary embodiment of the present invention includes a lithium metal secondary battery, a lithium ion secondary battery, a lithium polymer secondary battery, a lithium ion polymer secondary battery, or the like.

The lithium secondary battery of the present invention includes a cathode, an anode, and the electrolyte for a secondary battery according to an exemplary embodiment of the present invention.

Specifically, the cathode according to an exemplary embodiment of the present invention includes a cathode active material capable of intercalating and deintercalating lithium ions, and the cathode active material according to an exemplary embodiment of the present invention is a composite metal oxide of at least one transition metal selected from the group consisting of cobalt (Co), manganese (Mn), and nickel (Ni) with lithium, as a preferred combination with the electrolyte for a lithium secondary battery according to an exemplary embodiment of the present invention, and may be one or two or more selected from the group consisting of a lithium-manganese-based composite oxide, a lithium-cobalt-based composite oxide, a lithium-nickel-based composite oxide, a lithium-nickel-manganese-based composite oxide, a lithium-nickel-cobalt-based composite oxide, a lithium-cobalt-manganese-based composite oxide, and a lithium-nickel-cobalt-manganese-based composite oxide.

In the secondary battery including the cathode including a composite metal oxide of at least one transition metal selected from the group consisting of cobalt (Co), manganese (Mn), and nickel (Ni) with lithium as the cathode active material and the electrolyte for a secondary battery according to an exemplary embodiment of the present invention, the transition metal of the cathode and the cyclic phosphate compound included in the electrolyte are coordinately bonded and further stabilize a cathode structure, thereby inhibiting a side reaction of a cathode surface and the electrolyte during storage at a high temperature to prevent decomposition of the electrolyte, which results in prevention of production of gas to effectively inhibit a swelling phenomenon, and thus, storage stability at a high temperature of the lithium secondary battery may be improved.

A non-limiting example of the cathode active material may include any one or a mixture of two or more selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0\le y<1$), $Li_xNi_{1-y}Mn_yO_2$ ($0.5<x<1.3$, $0\le y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_xO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$), and $Li_xFePO_4$ ($0.5<x<1.3$).

The cathode active material according to an exemplary embodiment of the present invention may be a lithium-nickel-cobalt-manganese-based composite oxide as the most preferred combination with the electrolyte for a lithium secondary battery according to an exemplary embodiment of the present invention, preferably $Li_x(Ni_aCo_bMn_c)O_2$ ($0.5<x<1.3$, $0<a<1$, $0<b<1$, $0<c<1$, $a+b+c=1$), $Li_x(Ni_aCo_bMn_c)O_4$ ($0.5<x<1.3$, $0<a<2$, $0<b<2$, $0<c<2$, $a+b+c=2$), or a mixture thereof, and more preferably $Li_x(Ni_aCo_bMn_c)O_2$ wherein $0.90\le x\le 1.10$, $0.5\le a\le 0.99$, $0.005\le b<0.5$, $0.005\le c<0.5$, and $a+b+c=1$.

The cathode active material which is preferably combined with the electrolyte for a lithium secondary battery including a cyclic phosphate compound, included in the lithium secondary battery according to an exemplary embodiment of the present invention, particularly the electrolyte for a lithium secondary battery including one or two or more additional additives selected from the group consisting of an oxalatoborate-based compound, an oxalatophosphate-based compound, a fluorine-substituted carbonate-based compound, a vinylidene carbonate-based compound, and a sulfinyl group-containing compound with the cyclic phosphate compound, may be $Li_x(Ni_aCo_bMn_c)O_2$, wherein $0.90\le x\le 1.10$, $0.5\le a\le 0.99$, $0.005\le b<0.5$, $0.005\le c<0.5$, and $a+b+c=1$, and more preferably $Li(Ni_aCo_bMn_c)O_2$, wherein $0.5\le a\le 0.8$, $0.1\le b<0.5$, $0.1\le c<0.5$, and $a+b+c=1$.

Preferably, the cathode active material according to an exemplary embodiment of the present invention may be $LiNi_{0.6}Co_{0.2}Mn_{0.2}O_2$, $LiNi_{0.5}Co_{0.2}Mn_{0.3}O_2$, $LiNi_{0.8}Co_{0.1}Mn_{0.1}O_2$, or a mixture thereof.

The anode includes an anode current collector and an anode active material layer formed on the anode current collector, the anode active material layer includes an anode active material capable of intercalating and deintercalating lithium ions, and as the anode active material, carbon materials such as crystalline carbon, amorphous carbon, a carbon composite, and carbon fiber, a lithium metal, an alloy of lithium and another element, and the like may be used. A non-limiting example of the amorphous carbon includes soft carbon (low temperature baked carbon), hard carbon, coke, mesocarbon microbeads (MCMB) baked at 1500° C. or lower, mesophase pitch-based carbon fiber (MPCF), or the like. A non-limiting example of the crystalline carbon includes graphite-based materials, and specifically natural graphite, graphitized coke, graphitized MCMB, graphitized MPCF, or the like. The carbon materials are preferably a material having a d002 interplanar distance of 3.35 to 3.38 Å, and Lc (crystallite size) by X-ray diffraction of at least 20 nm or more. As other elements forming an alloy with lithium, aluminum, zinc, bismuth, cadmium, antimony, silicon, lead, tin, gallium, or indium may be used.

The cathode or the anode may be prepared by dispersing an electrode active material, a binder, a conductive material, and if necessary, a thickener in a solvent to prepare an electrode slurry composition, and applying the slurry composition on an electrode current collector. As a cathode current collector, aluminum, an aluminum alloy, or the like may be often used, and as an anode current collector, copper, a copper alloy, or the like may be often used. The cathode current collector and the anode current collector may be in the form of foil or mesh.

The binder is a material serving as formation of a paste of the active material, mutual adhesion of the active material, adhesion with the current collector, a buffer effect to expansion and shrinkage of the active material, and the like, and includes for example, polyvinylidene fluoride (PVdF), a copolymer of polyhexafluoropropylene-polyvinylidene fluoride (PVdF/HFP), poly(vinyl acetate), polyvinyl alcohol, polyethylene oxide, polyvinyl pyrrolidone, alkylated polyethylene oxide, polyvinyl ether, poly(methyl methacrylate), poly(ethyl acrylate), polytetrafluoroethylene, polyvinyl chloride, polyacrylonitrile, polyvinyl pyridine, a styrene butadiene rubber, an acrylonitrile-butadiene rubber, and the like. The content of the binder is 0.1 to 30 wt %, and preferably 1 to 10 wt %, based on the electrode active material. When the content of the binder is too low, the adhesion strength between the electrode active material and the current collector will be insufficient, and when the content of the binder is too high, the adhesion strength will be better, but the content of the electrode active material will be reduced by the increased amount of the binder, and thus, it is disadvantageous to increase a battery capacity.

The conductive material which is used for imparting conductivity to an electrode, may be any material as long as it does not cause any chemical change and is an electron conductive material in a composed battery, and at least one selected from the group consisting of a graphite-based conductive material, a carbon black-based conductive material, a metal, or a metal compound-based conductive material may be used as the conductive material. An example of the graphite-based conductive material includes artificial graphite, natural graphite, or the like, an example of the carbon black-based conductive material includes acetylene black, ketjen black, denka black, thermal black, channel black, or the like, and an example of the metal-based or metal compound-based conductive material includes a tin, tin oxide, tin phosphate ($SnPO_4$), titanium oxide, potassium titanate, perovskite materials such as $LaSrCoO_3$ or $LaSrMnO_3$. However, the conductive material is not limited thereto.

The content of the conductive material is preferably 0.1 to 10 wt %, based on the electrode active material. When the content of the conductive material is less than 0.1 wt %, an electrochemical property is deteriorated, and when the content is more than 10 wt %, energy density per weight is reduced.

The thickener is not particularly limited as long as it may serve to control the viscosity of active material slurry, and for example, carboxymethyl cellulose, hydroxylmethyl cellulose, hydroxyethyl cellulose, hydroxypropyl cellulose, or the like may be used.

As the solvent in which the electrode active material, the binder, the conductive material, and the like are dispersed, a nonaqueous solvent or an aqueous solvent is used. The nonaqueous solvent may include N-methyl-2-pyrrolidone (NMP), dimethyl formamide, dimethyl acetamide, N,N-dimethylaminopropylamine, ethylene oxide, tetrahydrofuran, and the like.

The lithium secondary battery according to an exemplary embodiment of the present invention may include a separator which prevents a short circuit between the cathode and the anode and provides an ion channel of lithium ions, and as the separator, a polyolefin-based polymer film such as polypropylene, polyethylene, polyethylene/polypropylene, polyethylene/polypropylene/polyethylene, and polypropylene/polyethylene/polypropylene, or a multiple film thereof, a microporous film, and woven and non-woven fabric may be used. Further, a film where a resin having excellent stability is coated on a porous polyolefin film may be used.

The lithium secondary battery of the present invention may be formed in other shapes such as cylindrical and pouch, in addition to a square shape. The secondary battery is also appropriate for uses requiring high voltage, high power, and high temperature drive, such as an electric vehicle, in addition to the conventional uses as a mobile phone, a portable computer, or the like. In addition, the secondary battery may be combined with conventional internal combustion engines, fuel cells, supercapacitors, and the like and used for a hybrid vehicle and the like also, and may be used for electric bicycles, machine tools, and other any uses requiring high power, high voltage, and high temperature drive.

Hereinafter, the Examples and Comparative Examples of the present invention will be described. However, the following Examples are only a preferred exemplary embodiment, and the present invention is not limited thereto. Assuming that a lithium salt is all dissociated so that a lithium ion concentration becomes 1 mol (1.0 M), a basic electrolyte may be formed by dissolving a corresponding amount of a lithium salt such as $LiPF_6$ in a basic solvent to a concentration of 1 mol (1.0 M).

[Example 1] Synthesis of Compound 1

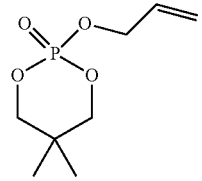

[1]

10 mL of tetrahydrofuran (THF) was introduced to sodium hydride (NaH, 0.39 g, 16.3 mmol), and the mixture was stirred while allyl alcohol (1.11 mL, 0.94 g, 16.3 mmol) was added dropwise for 15 minutes. After stirring for another 15 minutes, a solution of 2-chloro-5,5,-dimethyl-1,3,2-dioxaphosphorinane 2-oxide dissolved in tetrahydrofuran (15 mL) was added dropwise and the mixture was stirred at room temperature for 12 hours. When stirring was completed, the solvent was removed under reduced pressure, extraction was performed using dichloromethane ($CH_2Cl_2$) (30 mL) and distilled water (30 mL), and an organic layer was separated. Residual moisture in organic materials was separated with magnesium sulfate ($MgSO_4$) from the separated organic layer, and the residual material was filtered. The filtrate was concentrated under reduced pressure. The obtained residue was purified by silica gel column chromatography (eluent: 25% EtOAc in hexanes) to obtain 1.33 g (6.5 mmol) of Compound 1 in 39.7% yield.

$R_f$=0.30 [25% EtOAc in hexanes]; $^1$H NMR (500 MHz, $CDCl_3$) δ 5.86-6.04 (m, 1H), 5.22-5.40 (m, 1H), 4.51-4.61 (m, 2H), 4.08 (dd, $J_1$=5.9 Hz, $J_2$=8.8 Hz, 2H), 3.91 (dd, $J_1$=8.8 Hz, $J_2$=17.8 Hz, 2H), 1.24 (s, 3H), 0.90 (s, 3H) ppm.

[Examples 2 to 7, and Comparative Examples 1 to 8] Manufacture of Lithium Secondary Battery An electrolyte was prepared by dissolving $LiPF_6$ in a mixed solvent in which ethylene carbonate (EC):ethylmethyl carbonate (EMC):diethyl carbonate (DEC) are mixed at a volume ratio of 25:45:30 so as to be a 1.0 M solution to prepare a solution which is a basic electrolyte (1.0M $LiPF_6$, EC/EMC/DEC=25/45/30), and further introducing the components described in the following Table 1.

A battery to which the nonaqueous electrolyte was applied was manufactured as follows:

$LiNi_{0.6}Co_{0.2}Mn_{0.2}O_2$ as a cathode active material, polyvinylidene fluoride (PVdF) as a binder, and carbon as a conductive material were mixed at a weight ratio of 92:4:4, and then were dissolved in N-methyl-2-pyrrolidone to prepare a cathode slurry. An aluminum foil having a thickness of 20 μm was coated with this slurry, and then was dried and rolled to prepare a cathode.

An artificial graphite as an anode active material, a styrene butadiene rubber (SBR) as a binder, and carboxymethyl cellulose (CMC) as a thickener were mixed at a weight ratio of 96:2:2, and then were dispersed in water to prepare an anode slurry. A copper foil having a thickness of 15 μm was coated with this slurry, and was dried and rolled to manufacture an anode.

A film separator made of polyethylene (PE) having a thickness of 25 μm was stacked between the thus-manufactured electrodes to form a cell using a pouch having a size of a thickness of 8 mm×a width of 60 mm×a length of 90 mm, and the nonaqueous electrolyte was injected to manufacture a 1.7 Ah grade lithium secondary battery.

Performance of the thus-manufactured 1.7 Ah grade battery was evaluated as follows, and the results are shown in Table 2. Evaluation items were the following:

* Evaluation Items *

1. Thickness increase rate after 8 weeks at 60° C.: when the thickness of the battery after being charged at 4.35V with 1 C CC-CV at room temperature for 3 hours was set as 'A', and the thickness of the battery after being allowed to stand under a exposed normal pressure for 8 weeks in the atmosphere at 60° C. using a closed thermostat was set as 'B', the thickness increase rate was calculated by the following Equation 1. A cell thickness was measured using a flat plate thickness measuring apparatus (manufactured by Misutoyo Corporation, 543-490B).

Thickness increase rate (%)=$(B-A)/A$×100 [Equation 1]

2. Capacity retention ratio after 8 weeks at 60° C.: a battery was allowed to stand at 60° C. for 8 weeks and then at room temperature for 30 minutes, and calculation was performed by dividing a capacity obtained from 1 C rate CC discharge (2.7 V cut-off) after IR measurement by a capacity measured before storage and the result was shown in a percentage.

Capacity retention ratio of battery (%)=(final capacity/initial capacity)×100(%)

3. Capacity recovery rate after 8 weeks at 60° C. (storage efficiency at high temperature): a battery was allowed to stand at 60° C. for 8 weeks and then discharged with a current of 1 C with CC to 2.7 V, and then a usable capacity (%) relative to an initial capacity was measured.

4. Life at room temperature: A battery was charged at 4.35V with 1 C CC-CV at room temperature for 3 hours (0.05 C cut-off), and then discharged at 2.7 V with a current of 1 C to 2.7 V, which was performed 500 times repeatedly. In the above all charge-discharge cycles, the operation was paused for 10 minutes after one charge/discharge cycle. The life characteristics were calculated by the capacity retention ratio defined by the following Equation 2:

Capacity retention ratio (%)=[discharge capacity at $500^{th}$ cycle/discharge capacity at $1^{st}$ cycle]×100 [Equation 2]

TABLE 1

| | Electrolyte composition (total 100 wt %) |
|---|---|
| Example 2 | Basic electrolyte + 0.5 wt % of cyclic phosphate compound (1) |
| Example 3 | Basic electrolyte + 1.0 wt % of cyclic phosphate compound (1) |
| Example 4 | Basic electrolyte + 2.0 wt % of cyclic phosphate compound (1) |
| Example 5 | Basic electrolyte + 1.0 wt % of cyclic phosphate compound (1) + 0.5 wt % of LiBOB |
| Example 6 | Basic electrolyte + 1.0 wt % of cyclic phosphate compound (1) + 0.5 wt % of PS |
| Example 7 | Basic electrolyte + 1.0 wt % of cyclic phosphate compound (1) + 0.5 wt % of LiBOB + 0.5 wt % of PS |
| Comparative Example 1 | Basic electrolyte |
| Comparative Example 2 | Basic electrolyte + 0.5 wt % of LiBOB PS + 0.5 wt % of PS |
| Comparative Example 3 | Basic electrolyte + 1.0 wt % of Comparative Compound A |
| Comparative Example 4 | Basic electrolyte + 1.0 wt % of Comparative Compound B |
| Comparative Example 5 | Basic electrolyte + 1.0 wt % of Comparative Compound C |
| Comparative Example 6 | Basic electrolyte + 1.0 wt % of Comparative Compound A + 0.5 wt % of LiBOB + 0.5 wt % of PS |
| Comparative Example 7 | Basic electrolyte + 1.0 wt % of Comparative Compound B + 0.5 wt % of LiBOB + 0.5 wt % of PS |
| Comparative Example 8 | Basic electrolyte + 1.0 wt % of Comparative Compound C + 0.5 wt % of LiBOB + 0.5 wt % of PS |

Basic electrolyte: 1.0M $LiPF_6$, EC/EMC/DEC = 25/45/30
Cyclic phosphate compound (1):

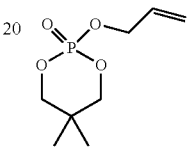

(1)
(Example 1)
Comparative Compound A:

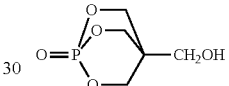

Comparative Compound B:

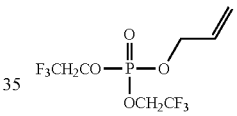

Comparative Compound C:

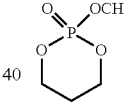

LiBOB: lithium bis(oxalato)borate
PS: 1,3-propane sultone

TABLE 2

| Lithium secondary battery | After 8 weeks at 60° C. | | | Life at room temperature |
|---|---|---|---|---|
| | Thickness increase rate [%] | Capacity retention ratio [%] | Capacity recovery rate [%] | Capacity retention ratio [%] |
| Example 2 | 160.9 | 25.0 | 22.2 | 53.4 |
| Example 3 | 119.6 | 27.9 | 25.7 | 62.1 |
| Example 4 | 87.6 | 31.5 | 29.7 | 70.0 |
| Example 5 | 88.0 | 39.9 | 38.4 | 71.4 |
| Example 6 | 74.6 | 31.5 | 29.7 | 65.7 |
| Example 7 | 44.2 | 43.2 | 39.6 | 76.8 |
| Comparative Example 1 | 189.0 | 20.0 | 18.4 | 42.1 |
| Comparative Example 2 | 120.4 | 32.4 | 30.2 | 52.7 |
| Comparative Example 3 | 165.6 | 20.9 | 19.5 | 42.4 |
| Comparative Example 4 | 142.9 | 23.6 | 21.7 | 57.5 |
| Comparative Example 5 | 129.6 | 24.9 | 23.7 | 59.8 |
| Comparative Example 6 | 95.0 | 36.1 | 34.0 | 58.0 |

TABLE 2-continued

| Lithium secondary battery | After 8 weeks at 60° C. | | | Life at room temperature |
|---|---|---|---|---|
| | Thickness increase rate [%] | Capacity retention ratio [%] | Capacity recovery rate [%] | Capacity retention ratio [%] |
| Comparative Example 7 | 68.0 | 39.6 | 36.0 | 74.0 |
| Comparative Example 8 | 55.8 | 40.5 | 37.6 | 74.9 |

As seen from the above Table 2, it was found that the lithium secondary battery including the electrolyte including the cyclic phosphate compound as the specific additive of the present invention had a low thickness increase rate even after being allowed to stand at 60° for 8 weeks, thereby having very high stability at a high temperature, and the lithium secondary battery showed an excellent capacity retention ratio in the life characteristic evaluation, thereby having an increased life improvement effect. In addition, it was found that the higher the content of the cyclic phosphate compound as a specific additive of the present invention is, the better the stability at a high temperature and the life characteristics are.

However, it was found that the lithium secondary batteries of Comparative Examples 1 to 8, which adopted an electrolyte including no cyclic phosphate compound as the specific additive of the present invention, had a high thickness increase rate after being allowed to stand at 60° C. for 8 weeks, and thus, had significantly deteriorated stability at high temperature and also did not have good life characteristics.

Therefore, it was found that the lithium secondary battery, which adopted the electrolyte including the cyclic phosphate compound as the specific additive of the present invention, had a low thickness increase rate at a high temperature, and also had high capacity retention ratio and capacity recovery rate, thereby significantly improving stability at a high temperature and also greatly improved life characteristics.

Besides, the electrolyte for a secondary battery including the cyclic phosphate compound as the specific additive of the present invention may further include lithium bis(oxalato)borate (LiBOB), propane sultone (PS), or a mixture thereof as an additional additive, thereby having more improved storage stability at a high temperature and life characteristics.

In particular, the lithium secondary battery which adopted the electrolyte including both of LiBOB and PS as the additional additive together with the cyclic phosphate compound as the specific additive of the present invention, had more improved stability at a high temperature and life characteristics.

It was found that the cyclic phosphate compound as the specific additive included in the electrolyte for a secondary battery of the present invention is coordinately bonded to nickel, cobalt, and manganese which are the transition metals of the cathode of the lithium secondary battery including the lithium-nickel-cobalt-manganese-based composite oxide as the cathode active material to stabilize the structure of the cathode, whereby a characteristic of inhibiting change in a battery thickness at a high temperature is shown.

The electrolyte for a lithium secondary battery according to the present invention includes a cyclic phosphate compound having a 6 to 8-membered cyclic phosphate structure in which an alkenyloxy is substituted on a phosphorus (P) atom, whereby life characteristics at room temperature are surprisingly improved, a thickness increase rate at a high temperature is significantly lowered to have excellent stability at a high temperature, and a capacity retention ratio and a capacity recovery rate at a high temperature are improved to have excellent storage characteristics at a high temperature.

The electrolyte for a lithium secondary battery according to the present invention includes a cyclic phosphate compound having a specific structure to lower resistance of a battery and also to be coordinately bonded to a transition metal of a cathode more stably and firmly to further stabilize the structure of the cathode, thereby minimizing a thickness increase rate at a high temperature. That is, the cyclic phosphate compound included in the electrolyte of the present invention stabilizes the structure of the cathode by a coordination bond with nickel, cobalt, or manganese which is the transition metal of the cathode of the lithium secondary battery including a composite metal oxide of at least one transition metal selected from the group consisting of cobalt, manganese, and nickel with lithium as a cathode active material, thereby significantly inhibiting change in the battery thickness at a high temperature.

That is, the cyclic phosphate compound accepts electrons to be decomposed before or simultaneously with the electrolyte to cause ring-opening polymerization while being coordinately bonded to the transition metal of the cathode to form an SEI film which is a protective film having strong binding force on the surface of the cathode active material layer, so that the reaction in the interface between the cathode and the electrolyte is more effectively inhibited, and particularly, a problem that the battery is swelled due to gas produced by decomposition of the electrolyte at the cathode during storage at a high temperature or continuous charge-discharge may be effectively improved.

In addition, an alkenyl group substituted on the cyclic phosphate compound also accepts electrons to be reductively decomposed while being decomposed on the surface of the cathode so that the SEI film is more stably and efficiently formed on the cathode active material to prevent direct contact between the cathode and the electrolyte, whereby significantly improved life characteristics and excellent characteristics at a high temperature are represented.

In addition, the electrolyte for a lithium secondary battery according to the present invention further includes one or two or more additional additives selected from the group consisting of an oxalatoborate-based compound, an oxalatophosphate-based compound, a fluorine-substituted carbonate-based compound, a vinylidene carbonate-based compound, and a sulfinyl group-containing compound, with the cyclic phosphate compound, thereby having better life characteristics and stability at a high temperature.

In addition, the lithium secondary battery of the present invention adopts the electrolyte for a secondary battery of the present invention including the cyclic phosphate compound, thereby maintaining basic performance such as a high efficiency charge-discharge characteristic and a life characteristic well, while showing a significantly low thickness increase rate at a high temperature, and having high capacity retention ratio and capacity recovery rate, thereby having excellent storage stability at a high temperature.

As described above, though the exemplary embodiments of the present invention have been described in detail, a person skilled in the art may make various variations of the present invention without departing from the spirit and the scope of the present invention, as defined in the claims which follow. Accordingly, any modification of the following Examples of the present invention may not depart from the technique of the present invention.

What is claimed is:

1. A lithium secondary battery comprising:
a cathode comprising a cathode active material,
an anode comprising an anode active material,
a separator interposed between the cathode and the anode, and
an electrolyte for a secondary battery,
wherein the cathode active material is $Li_x(Ni_aCo_bMn_c)O_2$, wherein $0.90 \leq x \leq 1.10$, $0.5 \leq a \leq 0.99$, $0.005 \leq b < 0.5$, $0.005 \leq c < 0.5$, and $a+b+c=1$, and
the electrolyte for a secondary battery comprises a lithium salt, a nonaqueous organic solvent, an oxalatoborate-based compound, and a cyclic phosphate compound represented by the following Chemical Formula 2:

[Chemical Formula 2]

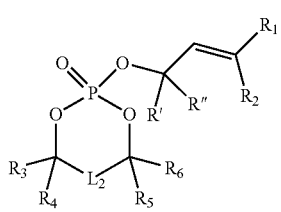

wherein
$R_1$ to $R_6$ and R' and R'' are independently of one another hydrogen or C1-C4 alkyl;
$L_2$ is $-CR_7R_8-$; and
$R_7$ and $R_8$ are independently of each other hydrogen or C1-C4 alkyl..

2. The lithium secondary battery of claim 1, wherein the cathode active material is $Li(Ni_aCo_bMn_c)O_2$, wherein $0.5 \leq a \leq 0.8$, $0.1 \leq b < 0.5$, $0.1 \leq c < 0.5$, and $a+b+c=1$; and
the cyclic phosphate compound is represented by the following Chemical Formula 3:

[Chemical Formula 3]

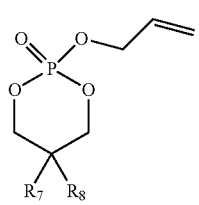

wherein $R_7$ and $R_8$ are independently of each other hydrogen or C1-C3 alkyl.

3. The lithium secondary battery of claim 2, wherein the cathode active material is $LiNi_{0.6}Co_{0.2}Mn_{0.2}O_2$, $LiNi_{0.5}Co_{0.2}Mn_{0.3}O_2$, $LiNi_{0.8}Co_{0.1}Mn_{0.1}O_2$, or a mixture thereof.

4. The lithium secondary battery of claim 1, wherein the cyclic phosphate compound is any one selected from the following structures:

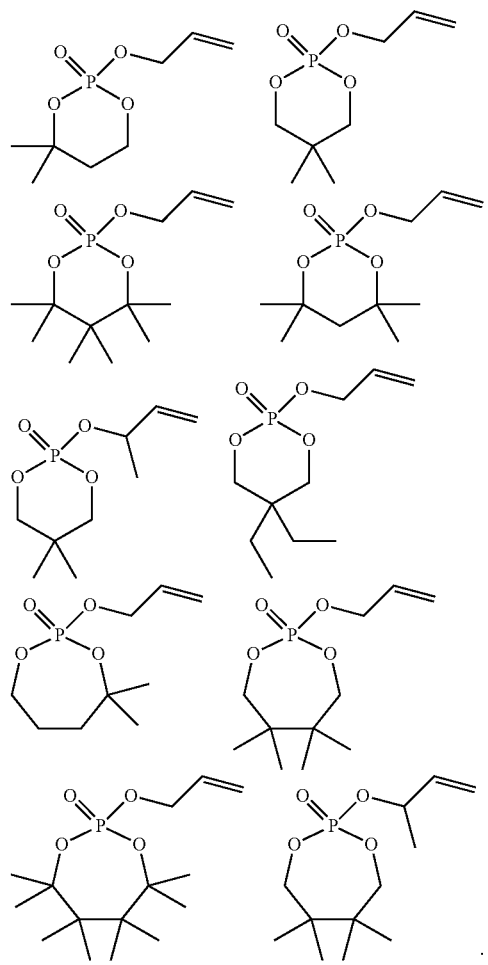

5. The lithium secondary battery of claim 4, wherein the cyclic phosphate compound is included at 0.1 to 5.0 wt %, based on a total weight of the electrolyte.

6. The lithium secondary battery of claim 1, wherein the electrolyte further comprises: one or two or more additives selected from the group consisting of an oxalatophosphate-based additive, a fluorine-substituted carbonate-based compound, a vinylidene carbonate-based compound, and a sulfinyl group-containing.

7. The lithium secondary battery of claim 6, wherein the electrolyte further comprises: any one or two or more additives selected from the group consisting of lithium tetrafluoro(oxalato)phosphate, lithium difluoro bis(oxalato) phosphate, fluoroethylene carbonate, difluoroethylene carbonate, fluorodimethyl carbonate, fluoroethylmethyl carbonate, vinylene carbonate, vinyl ethylene carbonate, dimethyl sulfone, diethyl sulfone, ethyl methyl sulfone, methyl vinyl sulfone, divinyl sulfone, ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, 1,3-butylene glycol sulfite, methyl methanesulfonate, ethyl methanesulfonate, methyl ethanesulfonate, propyl methanesulfonate, methyl propanesulfonate, ethyl propanesulfonate, vinyl methanesulfonate, allyl methanesulfonate, vinyl benzenesulfonate, allyl prop-2-enesulfonate, ethanesultone, 1,3-propanesultone, 1,4-butanesultone, ethenesultone, 1,3-propenesultone, 3-fluoro-1,3-propanesultone, 1,4-butenesultone, ethylene sulfate, propylene sulfate, 2,3-butylene sulfate, 1,3-propylene sulfate, 1,3-butylene sulfate and mixtures thereof.

8. The lithium secondary battery of claim 6, wherein the additive is included at 0.1 to 5.0 wt %, based on the total weight of the electrolyte.

9. The lithium secondary battery of claim 1, wherein the nonaqueous organic solvent is selected from the group consisting of a cyclic carbonate-based solvent, a linear carbonate-based solvent, and a mixed solvent thereof.

10. The lithium secondary battery of claim 9, wherein the cyclic carbonate-based solvent is selected from the group consisting of ethylene carbonate, propylene carbonate, butylene carbonate, vinylene carbonate, vinylethylene carbonate, fluoroethylene carbonate, and a mixture thereof, and the linear carbonate is selected from the group consisting of dimethyl carbonate, diethyl carbonate, dipropyl carbonate, ethylmethyl carbonate, methylpropyl carbonate, methylisopropyl carbonate, ethylpropyl carbonate, and a mixture thereof.

11. The lithium secondary battery of claim 9, wherein the nonaqueous organic solvent has a mixed volume ratio of the linear carbonate solvent to the cyclic carbonate solvent of 1:1 to 9:1.

12. The lithium secondary battery of claim 1, wherein the lithium salt is one or two or more selected from the group consisting of $LiPF_6$, $LiBF_4$, $LiClO_4$, $LiSbF_6$, $LiAsF_6$, $LiN(SO_2C_2F_5)_2$, $LiN(CF_3SO_2)_2$, $LiN(SO_3C_2F_5)_2$, $LiN(SO_2F)_2$, $LiCF_3SO_3$, $LiC_4F_9SO_3$, $LiC_6H_5SO_3$, LiSCN, $LiAlO_2$, $LiAlCl_4$, $LiN(C_xF_{2x+1}SO_2)(C_yF_{2y+1}SO_2)$ (wherein x and y are independently of each other a natural number), LiCl, LiI, and $LiB(C_2O_4)_2$.

13. The lithium secondary battery of claim 1, wherein the lithium salt is present at a concentration of 0.1 to 2.0 M.

14. The lithium secondary battery of claim 1, wherein the oxalatoborate-based compound is at least one of lithium difluoro(oxalato)borate and/or lithium bis(oxalato)borate.

* * * * *

UNITED STATES PATENT AND TRADEMARK OFFICE
CERTIFICATE OF CORRECTION

Page 1 of 2

PATENT NO. : 12,046,715 B2
APPLICATION NO. : 17/495864
DATED : July 23, 2024
INVENTOR(S) : Sung Yon Oh et al.

It is certified that error appears in the above-identified patent and that said Letters Patent is hereby corrected as shown below:

In the Claims

Column 21, Line 40, Claim 1, delete "alkyl.." and insert -- alkyl. --

Column 21, Line 63, Claim 3, delete "LiNi$_{0.5}$Co$_{0.2}$; Mn$_{0.3}$O$_2$," and insert -- LiNi$_{0.5}$Co$_{0.2}$Mn$_{0.3}$O$_2$, --

Column 21, Line 65, through Column 22, Lines 39, Claim 4, delete "The lithium secondary battery of claim 1, wherein the cyclic phosphate compound is any one selected selected from the following structures:

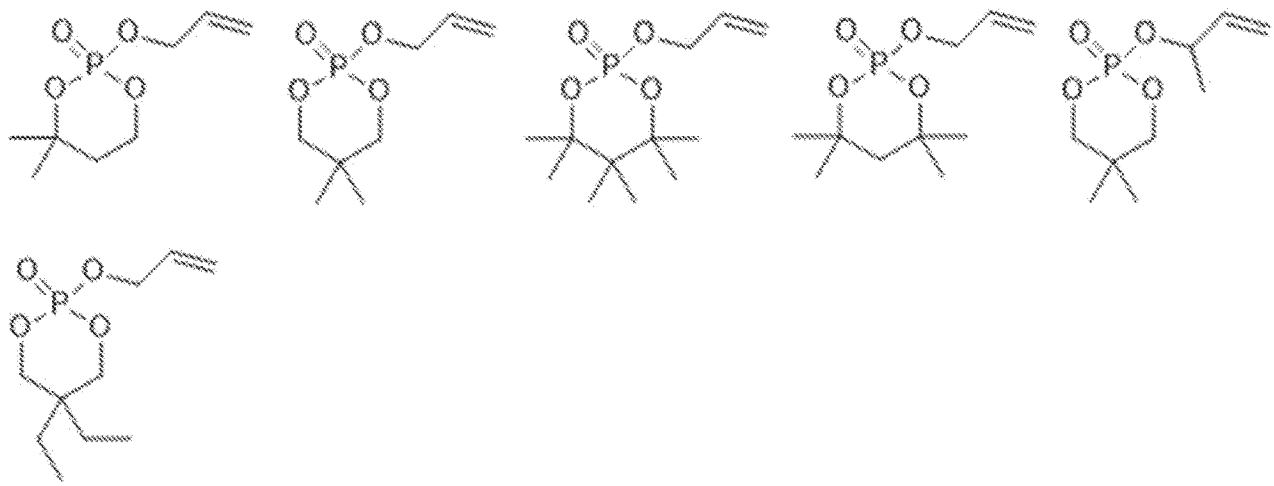

Signed and Sealed this
Twenty-ninth Day of October, 2024

Katherine Kelly Vidal
*Director of the United States Patent and Trademark Office*

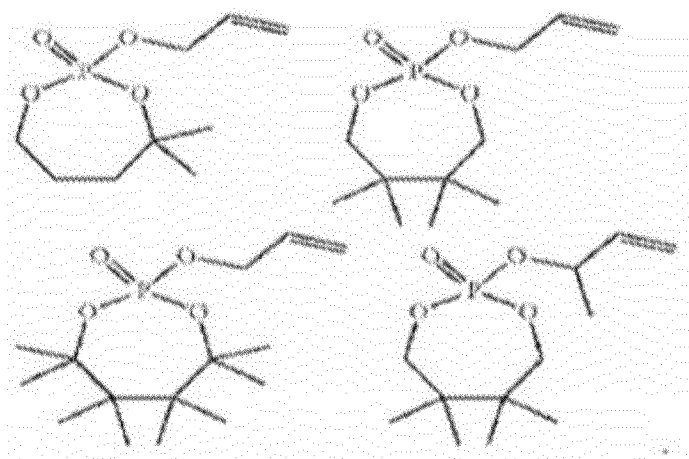
" and insert -- The lithium secondary battery of claim 1, wherein the cyclic phosphate compound is
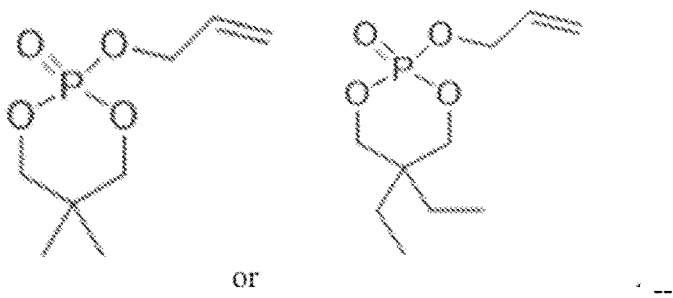
--